(12) United States Patent
Peng et al.

(10) Patent No.: US 6,200,517 B1
(45) Date of Patent: Mar. 13, 2001

(54) METHODS FOR REMOVING ORGANICS FROM GREEN STRUCTURES DURING FIRING

(75) Inventors: Y. Lisa Peng, Big Flats; May Y. Xun, Painted Post, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/356,296

(22) Filed: Jul. 16, 1999

Related U.S. Application Data

(60) Provisional application No. 60/095,292, filed on Aug. 4, 1998.

(51) Int. Cl.[7] .............................. B28B 3/20; C04B 33/32
(52) U.S. Cl. ......................... 264/630; 264/638; 264/669; 264/670
(58) Field of Search .................................. 264/630, 638, 264/669, 670

(56) References Cited

U.S. PATENT DOCUMENTS

| | | |
|---|---|---|
| 3,885,977 | 5/1975 | Lachman et al. . |
| 4,216,116 | 8/1980 | Kline . |
| 4,265,794 | 5/1981 | Pett et al. . |
| 4,758,272 | 7/1988 | Pierotti et al. . |
| 4,992,233 | 2/1991 | Swaroop et al. . |
| 5,019,537 | 5/1991 | Kato et al. . |
| 5,344,799 | 9/1994 | Wu . |
| 5,427,601 | 6/1995 | Harada et al. . |
| 5,568,652 | * 10/1996 | Wu ........................................ 419/2 |
| 5,574,957 | 11/1996 | Barnard et al. . |
| 6,113,829 | * 9/2000 | Bookbinder et al. ........... 264/211.11 |

* cited by examiner

Primary Examiner—Christopher A. Fiorilla
(74) Attorney, Agent, or Firm—L. Rita Herzfeld; Anca C. Gheorghiu

(57) ABSTRACT

A method for forming an article involves forming a mixture of components of powder materials, organic binder, solvent for the binder, non-solvent with respect to at least the binder, the solvent, and the powder materials, wherein the non-solvent is lower in viscosity than the binder combined with the solvent, and an agent for retarding the oxidation of the organic components. The components are mixed and plasticized, and shaped into a green structure which is then fired to impart strength and form the product article. The product article has fewer cracks than it would have absent the oxidation-retarding agent.

18 Claims, 5 Drawing Sheets

METHODS FOR REMOVING ORGANICS FROM GREEN STRUCTURES DURING FIRING

This application claims the benefit of U.S. Provisional Application No. 60/095,292, filed Aug. 4, 1998, entitled "Method for Removing Organics from Green Structures during Firing", by Peng et al.

This invention relates to methods for removing organics from shaped green structures without causing cracking in the structures during firing. More particularly, it relates to removal of organic phases from green structures by delaying oxidation or combustion of the organics during the firing cycle of the structures by including antioxidants in the forming mixtures, thus imparting benefits to green structures, such as stiffness and lubrication.

BACKGROUND OF THE INVENTION

Powder mixtures having a cellulose ether binder are used in forming articles of various shapes. For example ceramic powder mixtures are formed into honeycombs which are used as substrates in catalytic and adsorption applications. The mixtures must be well blended and homogeneous in order for the resulting body to have good integrity in size and shape and uniform physical properties. The mixtures have organic additives in addition to the binders. These additives can be surfactants, lubricants, and dispersants and function as processing aids to enhance wetting thereby producing a uniform batch.

A major and ongoing need in extrusion of bodies from highly filled powder mixtures, especially multicellular bodies such as honeycombs is to extrude a stiffer body without causing proportional increase in pressures. The need is becoming increasingly critical as thinner walled higher cell density cellular structures are becoming more in demand for various applications. Thin walled products with current technology are extremely difficult to handle without causing shape distortion.

Rapid-setting characteristics are important for honeycomb substrates. If the cell walls of the honeycomb can be solidified quickly after forming, the dimension of the greenware will not be altered in subsequent cutting and handling steps. This is especially true for a fragile thin-walled or complex shaped product, or a product having a large frontal area.

More recently, attempts to extrude stiffer ceramic batches with the current batch components, i.e. cellulose ether binder, involving use of various organic materials in the forming mixture have been successful. One drawback of using organic materials, however, is that they have to be removed from the shaped green structure during the firing cycle. This generally results in cracking of the body possibly due to pressure build up inside the structure and/or differential heat produced by combustion of the organics in the early stages of firing.

The growing need for thinner webs (1–2 mil)/high density cellular products to be extruded to shape necessitates stiffer batches; and certain organics in the batch contribute to stiffening of the green structures. Therefore, a method to avoid the cracking during organic removal is highly desirable and would be a significant advancement in the art.

The present invention provides such a method.

SUMMARY OF THE INVENTION

In accordance with one aspect of the invention, there is provided a method for forming an article, that involves forming a mixture of components of powder materials, organic binder, solvent for the binder, non-solvent with respect to at least the binder, the solvent, and the powder materials, wherein the non-solvent is lower in viscosity than the binder combined with the solvent, and an agent for retarding the oxidation of the organic components. The components are mixed and plasticized, and shaped into a green structure which is then fired to impart strength and form the product article. The product article has fewer cracks than it would have absent the oxidation-retarding agent.

DETAILED DESCRIPTION OF THE INVENTION

Figure 1:
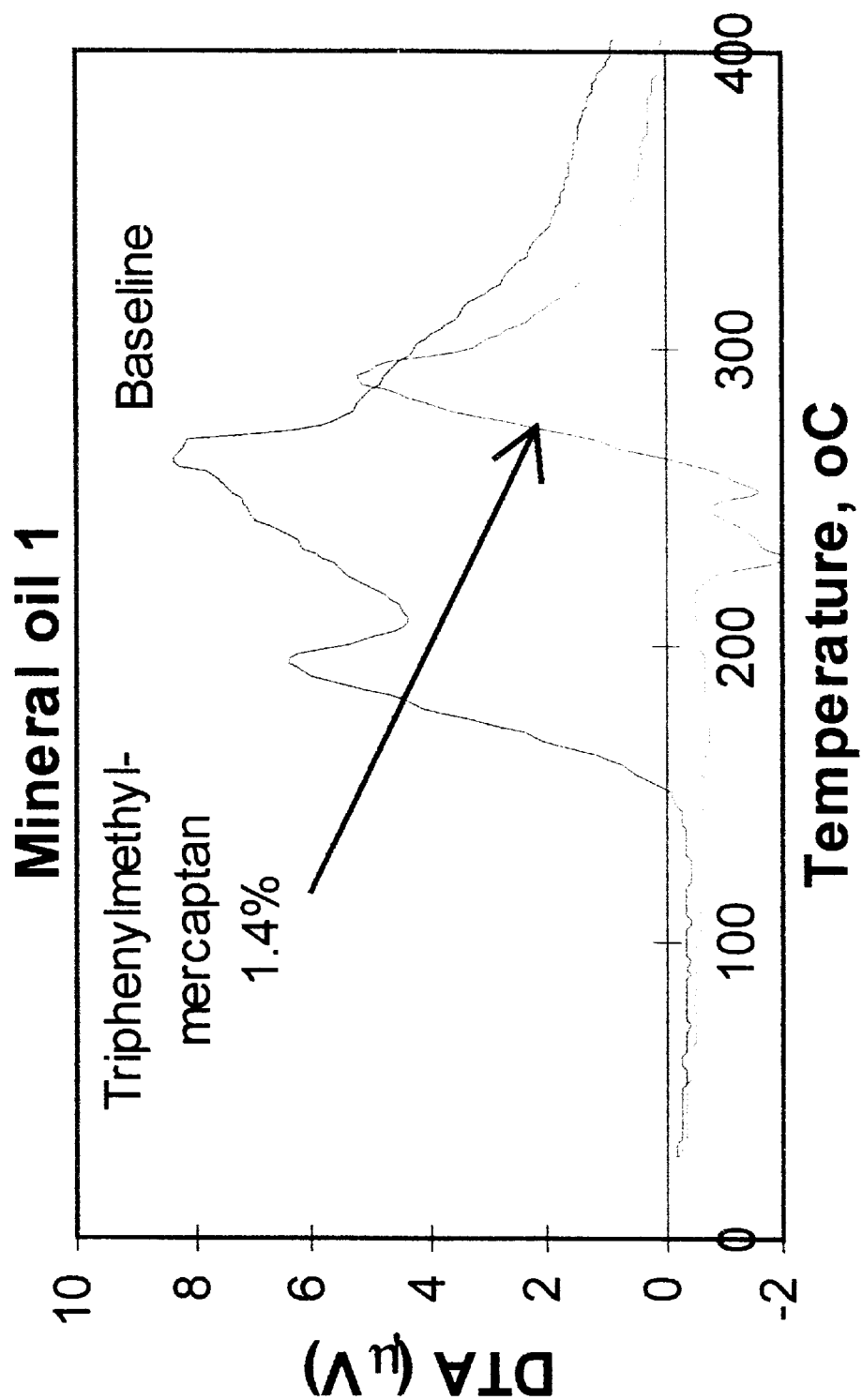
FIGS. 1–5 are differential thermal analyses (DTA's) of honeycombs made with various anti-oxidant compositions according to this invention.

This invention relates to a method of making articles by shaping plasticized powder mixtures containing binder, solvent for the binder, a component in which at least the binder is not soluble (non-solvent), followed by firing in which cracking during firing is minimized or eliminated by use of oxidation-retarding agents (also referred to as antioxidants) in forming mixtures. It is suitable for plasticized mixtures containing organics.

This invention relates to methods for removing organics from shaped green structures without causing cracking in the structure when being fired to form high strength materials, e.g. ceramic materials. More particularly, it relates to removal of organic compounds from green structures by delaying oxidation or combustion of the organics during the firing cycle of the structure, by including oxidation-retarding agents or antioxidants in the forming mixtures. As a result of delaying oxidation during temperature rise in the furnace, significantly more organics in the green structure leave the body via vaporization or thermal decomposition. This results in a net reduction of the exothermic heat caused by oxidation in the firing cycle, because decomposition or cracking and vaporization are endothermic processes. Smaller differential heat is thus possible with reduced exothermic reactions and therefore, chances of cracking induced by differential heat are significantly reduced or eliminated.

Several additional benefits are realized by using antioxidants in the forming mixture, such as increased green structure strength and stiffness, reduced amounts of liquids, e.g. non-solvent, and solvent phases as would be required otherwise to achieve the desired stiffness for the green body. In short, this invention relates to using antioxidants to achieve a smooth crack-free firing with the added benefits to the forming of green bodies, for example higher green strength and stiffness, less non-solvent and solvent for relatively same stiff batches. The method is particularly important for firing of extruded thin wall (e.g., for those having approximate dimensions of 62 cells/cm2 (400 cell/in$^2$), and 0.1 or 0.15 mm (4 or 6 mil) web thickness) and ultra thin wall (e.g. 135 cells/cm$^2$ (900 cells/in$^2$), and 0.07 mm (3 mil) web thickness, or 180 cells/cm$^2$ (1200 cells/in$^2$) and 0.048 mm (2 mil) web thickness) honeycombs, where a relatively larger amount of non-solvent is used for extruding a stiffer green body using lower mixing torque.

This invention is applicable to powder mixtures containing organics but is especially suitable for forming and shaping stiff plasticized powder mixtures containing a binder, solvent for the binder, and a component in which at least the binder, its solvent, and the powder materials are essentially insoluble, and finally an antioxidant component. The solvent-insoluble component is referred to as the non-solvent, although there can be some solubility of the binder and solvent in the non-solvent. It is preferred that the binder and its solvent be completely insoluble in the non-solvent. Generally, some solvent is removed to increase the gel strength of the binder in the solvent and the mixture. The solvent so removed is replaced with the non-solvent. Such a system is disclosed in U.S. patent application Ser. No. 60/055,184, filed Aug. 8, 1997, which is herein incorporated by reference. The antioxidant referred to in the current invention can be present in a very small amount and can be present as a viscous liquid and/or a fine powder. As a result of the presence of the antioxidant, an increase in green strength and stiffness is usually observed, accompanying a reduced requirement of either solvent or non-solvent or both, depending on the specific antioxidant used. A surfactant can optionally be present.

The combinations of the component mentioned above result in improved wet green strength in the green body than otherwise occurs. Furthermore, this increase in wet green strength occurs without proportional increases in forming e.g. pressure or mixing torque. Also, in extrusion of the above mixtures, the shape of the extrudate or green body is retained at the very instant it exits the die, with no time delay.

Formability of the solvent-deprived stiff batches is enhanced by the use of the non-solvent. The antioxidants, particularly liquid antioxidants can also further enhance formability. The two components together provide the fluidity necessary for extrusion while maintaining the stiffness of the binder gel in the solvent. While not wishing to be bound by theory, it is believed that the formability is enhanced by the non-solvent and liquid antioxidant being at two critical interfaces: (1) at the interface between the batch and the wall of the shaping apparatus, e.g. in extrusion this is the die/extruder wall, front end hardware (screen pack, homogenized flow control device), and (2) at the interfaces between the individual powder particles.

By highly filled mixtures is meant a high solid to liquid content in the mixture. For example, the powder material content in the mixture is typically at least about 45% by volume, and most typically at least about 55% by volume.

The Powder Material

Typical powders are inorganics such as ceramic, glass ceramic, glass, molecular sieve, metal, or combinations of these.

The invention is especially suitable for use with ceramic, particularly with cordierite and/or mullite-forming raw material powders.

By ceramic, glass ceramic and glass ceramic powders is meant those materials as well as their pre-fired precursors. By combinations is meant physical or chemical combinations, e.g., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, e.g., silicon carbide, silicon nitride, soda lime, aluminosilicate, borosilicate, soda barium borosilicate or mixtures of these, as well as others.

Especially suited are ceramic materials, such as those that yield cordierite, mullite, or mixtures of these on firing, some examples of such mixtures being about 2% to about 60% mullite, and about 30% to about 97% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with a preferred embodiment, one composition which ultimately forms cordierite upon firing is as follows in percent by weight, although it is to be understood that the invention is not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide.

The powders can be synthetically produced materials such as oxides, hydroxides, etc., or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, such as Hydrite MP™ clay, or Hydrite PX™ clay, delaminated kaolinite, such as KAOPAQUE-10™ (K10) clay, and calcined clay, such as Glomax LL. All of the above named materials are sold by Dry Branch Kaolin, Dry Branch, Ga.

Some typical kinds of talc are those having a surface area of about 5–8 $m^2/g$, such as supplied by Barretts Minerals, under the designation MB 96–67.

Some typical aluminas are coarse aluminas, for example, Alcan C-700 series, such as C-701™, or fine aluminas such as A-16SG from Alcoa.

One typical kind of silica is that having a particle size of about 9–11 micrometers, and a surface area of about 4–6 $m^2/g$, such as IMSIL™ sold by Unimin Corporation.

In filter applications, such as in diesel particulate filters, it is customary to include a burnout agent in the mixture in an amount effective to subsequently obtain the porosity required for efficient filtering. A burnout agent is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are graphite, cellulose, flour, etc. Elemental particulate carbon is preferred. Graphite is especially preferred because it has the least adverse effect on the processing. In an extrusion process, for example, the rheology of the mixture is good when graphite is used. Typically, the amount of graphite is about 10% to about 30%, and more typically about 15% to about 30% by weight based on the powder material.

Molecular sieves can also be shaped into bodies in accordance with this invention. Molecular sieves are crystalline substances having pores of size suitable for adsorbing molecules. The molecular sieve can be in the crystallized form or in the ammonium form or hydrogen form, or ion-exchanged with or impregnated with a cation. The molecular sieves can be provided in ion exchanged form or impregnated with cations either before forming into a body or after the product body has formed. The ion-exchange and impregnation methods are well known processes. Such treatments are within the scope of this invention.

Some types of molecular sieves which are preferred for the practice of the present invention are zeolites, metallophosphates, silicoaluminophosphates, and combinations of these.

The molecular sieves that are especially suited to the invention are the zeolites. Some suitable zeolites are pentasil, such as ZSM-5, Y, such as ultrastable Y, beta, mordenite, X, such as 13X, or mixtures thereof.

Any sinterable metal or metal composition can be used in the practice of the present invention. Especially suited are iron group metal, chromium, and aluminum compositions, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders are disclosed in U.S. Pat. Nos. 4,992,233, 4,758,272, and 5,427,601 which are herein incorporated by reference as filed. U.S. Pat. No. 4,992,233 relates to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as eg., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

In general, the powder material is fine powder (in contrast to coarse grained materials) some components of which can either impart plasticity, such as clays, when mixed with water for example, or which when combined with the organic binder can contribute to plasticity.

The weight percents of the various components are calculated by the following formula:

$$\frac{\text{weight of component}}{\text{total weight of inorganic powders in the batch}} \times 100$$

The Binder

The function of the binder is to bind the inorganic powders and impart plasticity to the batch when mixed with a solvent. The preferred binders used in this invention are aqueous based, that is, capable of hydrogen bonding with polar solvents. Examples of binders are cellulosics, starches, poly(vinyl alcohol), poly(vinyl pyrrolidone), gums such as guar gum, xanthan gum, carageenan, etc., alginates, polyethylene oxides, polyamides, and/or polyacrylates. A combination of binder and cross-linking agent can also be used as a binder component (e.g. polyvinyl alcohol with borax, polyacrylates with poly(vinyl alcohol). Hydrophobically modified aqueous binders can also be used.

Especially useful in the practice of this invention are cellulose ether binders for aqueous systems.

Some typical cellulose ether binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Cellulose ethers that provide especially good hydrophobic-hydrophilic balance are hydroxypropyl methylcellulose, hydroxyethylcellulose, hydroxyethyl methylcellulose, a combination of hydroxyethyl or hydroxypropyl with methyl, ethyl, propyl, and butyl cellulose.

The organic binder makes up typically about 2–12% by weight, and more typically about 2–4% by weight of the mixture.

The Solvent

The solvent provides a medium for the binder to dissolve in thus providing plasticity to the batch and wetting of the powders. The solvent can be aqueous based, which are normally water or water-miscible solvents; or organically based. Most useful are aqueous based solvents which provide hydration of the binder and powder particles.

The Non-solvent

The non-solvent is not a solvent relative for at least the binder, the solvent, and the powder materials. Partial solubility of cellulose ether binders in the non-solvent would result in increase of viscosity of the non-solvent, and loss of lubricating properties needed to shape a stiff batch. This would result in an increase in shaping pressures and torques. The function of the non-solvent is to provide the fluidity necessary for shaping, while maintaining the strength of the binder in the solvent. The non-solvent can have dissolved surfactants, secondary binders, lubricants, and additives that enhance the rheological performance. The amount of dissolved substances should be so as to not to adversely impact the rheology of the mixture.

In case of an aqueous binder system, the non-solvent is hydrophobic relative to binder in the solvent e.g. water. One preferred binder-solvent combination is cellulose ether in water. In this combination, the non-solvent hydrophobically associates through the methyoxy substituent of the binder. This combination is especially advantageous for cordierite and/or mullite-forming raw material powders.

With aqueous-based binder solvents, such as water, non-solvents can be chosen from both synthetic and natural substances.

According to this invention, the preferred non-solvents include but are not limited to paraffins, olefins, aromatics, and/or polymers, with $C_{17}$ to C35 paraffins, and/or $C_{20}$ to $C_{30}$ para alpha olefins being especially preferred.

However, a number of other non-solvents can be used such as hydrocarbons other than what is listed above, silicones, fluorine compounds, phosphate esters, esters, liquid $CO_2$, supercritical fluids e.g. supercritical $CO_2$, and hot water at a temperature above the thermal gelation temperature for a given cellulose ether, and combinations of these. When hot water is used as a non-solvent, it is in combination with at least one other non-solvent component.

Examples of other useful hydrocarbons are alkanes, alkenes, alkynes, cycloaliphatics, synthetic lubricant base stocks (industrial, automotive, agricultural), polyolefins, among others. Examples of these types of materials are paraffinic oils, e.g. various mineral oils, hydrogenated polybutenes, alpha olefins, internal olefins, polyphenyl ethers, polybutenes, and polyisobutylene.

Examples of esters are synthetic mono and diesters, and natural fatty acid esters (glycerides). Examples of mono and diesters are adipates, phthalates, polyol esters such as trimethylolpropane, and pentaerythritol. Examples of fatty acid esters are natural plant and animal glycerides such as soybean oil, sunflower, palm, corn, coconut, cottonseed, castor oil, peanut oil, essential oils (rose, jasmine, orange, lime, etc.) soya fatty acid, tallow, bacon grease, lard, and fish oil.

Non-solvents can also be solids as long as they are processed at or above the melting point of the solid. For example, fatty acids and fatty alcohols of carbon chain length greater than 22 can be used alone or in combination with other non-solvent components.

Natural esters having 14 or more carbon atoms in their chains, and/or synthetic esters are also very suitable, as are fatty acid glycerides, monoesters, diesters, and combinations of these.

High molecular weight polybutenes, polyol esters, a blend of light mineral oil and wax emulsion, a blend of paraffin wax in corn oil and combinations of these are also suitable.

The solvent for the binder can also be made to function as a partial non-solvent and a partial solvent for the binder through use of additives in the batch. For example, in the case of aqueous based solvents such as water and a cellulose ether binder, additives that have greater affinity for water than for the cellulose ether binder, dehydrate the cellulose ether. The additives can be used to shift the solvent-non-solvent character of the water. The extent of dehydration is dependent on the additive concentration. The solvent/non-solvent balance of water can be adjusted with the type and concentration of additives such as glycerin, corn syrup, maple syrup, sucrose, sorbitol, and electrolytes such as the salts of alkali and alkaline earth metals.

The Surfactant

The surfactant, if present, plays an important role in determining the interfacial properties between the inorganic powders, between the inorganics and organics, and between the components of the organic system. The surfactant has the greatest influence in determining the gel strength of the binder, adhesion of the binder gel to the inorganics, and adhesion of the non-solvent to the binder. It promotes emulsification between the solvent and non-solvent. The preferred surfactants co-exist with the binder at the interface between the solvent and non-solvent. In the formed mixture, the surfactant is at least partially miscible in both the solvent and the non-solvent. It disperses/wets the inorganic powders.

Typically, the surfactant is suitable if, by itself without other substances, it is insoluble in the solvent at room temperature.

Some surfactants that can be used in the practice of the present invention are $C_8$ to $C_{22}$ fatty acids and/or their derivatives. Additional surfactant components that can be used with these fatty acids are $C_8$ to $C_{22}$ fatty esters, $C_8$ to $C_{22}$ fatty alcohols, and combinations of these. Preferred surfactants are stearic, lauric, oleic, linoleic, palmitoleic acids, and their derivatives, stearic acid in combination with ammonium lauryl sulfate, and combinations of all of these. Most preferred surfactants are lauric acid, stearic acid, oleic acid, and combinations of these. An especially preferred non-solvent for use with this latter group of surfactants is light mineral oil ($C_{17}$–$C_{35}$)

The Oxidation-retarding Agent or Antioxidant

The primary function of the oxidation-retarding agent is to delay the onset of oxidation of organics (e.g. the binders, surfactants and non-solvents referred to above) during the firing cycle. The antioxidants act as a temporary hindrance to the oxidation of organics during firing of the ceramic green bodies. They can be removed during the later period of the firing cycle, or some element in them can remain in the body as long as they do not impose adverse effects on properties, such as thermal expansion and strength, on the fired body. By delaying the onset of exothermic oxidation reaction, various organic compounds, especially the non-solvents are allowed to either evaporate (endothermic) or thermally decompose (also endothermic). Net heat production caused by oxidation is significantly reduced, that would otherwise cause larger temperature gradients and cracking of the parts. The invention is particularly suited for firing of thinner wall honeycomb structures where the green body is much weaker and more prone to cracking.

All organic compounds are susceptible to attack by molecular oxygen especially at elevated temperatures, as is encountered in the firing of a green extrudate. It is called auto oxidation, or autocatalytic oxidation. The oxidation reactions usually start slowly, possibly by a short induction period, followed by an increase in reaction rate. The oxidation is usually very exothermic. Extensive heat and/or differential heat can thus accumulate on the part at the early stage of the firing cycle. This is ascribed to be the main reason that causes the part to crack.

Various approaches to antioxidation are related to delaying the initiation and controlling the formation of peroxides, one of main oxidation products of organics at the early stage of firing. The exact functions of various antioxidants depend on their structures and types.

Some antioxidants that can be used are free-radical trappers, peroxide decomposers, and/or metal deactivators. Advantageously, the antioxidants are hindered phenols, secondary amines, organosulfur compounds, trivalent phosphorus compounds, selenium compounds, and/or aryl derivatives of tin.

More advantageously, the antioxidants are triphenylmethylmercaptan, 2-Mercaptobenzothiozole, 2,6-Di-t-butyl-4-methylphenyl, 2,4,6-Trimethylphenyl, butylated octylated phenol, butylated di(dimethylbenzyl)phenol, and/or 1:11 (3,6,9-trioxaudecyl)bis-(dodecylthio) propionate.

The most preferred antioxidants are butylated octylated phenol, and a combination of butylated octylated phenol and 1:11 (3,6,9-trioxaudecyl)bis-(dodecylthio)propionate.

Hindered phenols and aromatic amines act as radical scavengers. Radical-scavenging antioxidants (also called radical trappers) act by donating a hydrogen atom to the peroxy radical, ROO,. This breaks the self-propagating chain and forms A, a stable radical:

ROO,+AH→ROOH+A,

ROO,+A,→inert products

2A,→inert products

Some suitable hindered phenols and aromatic amines are monophenols such as 2,6-di-tert-butylphenol, 2,6-di-tert-butyl-4-methylphenol, 2,6-di-tert-butyl-4-sec-butylphenol; biphenols such as 4,4'-methylene bis (2,6-di-tert-butyl phenol); 4,4'-Thiobis-(2-methyl-6-tert-butylphenol, and thiodiethylene bis-(3,5-di-tert-butyl-4-hydroxy) hydrocinnamate; polyphenols such as tetrakis(methylene (3,5-di-tert-butyl-4-hydroxydrocinnamate)methane, and aromatic amines such as N-phenyl-I-naphthylamine, p-oriented styrenated diphenylamine, octylated diphenylamines; alkylated p-phenylenediamines, and N-phenyl-N'-(1,3-dimethyl-butyl)-p-phenylenediamine.

Organic sulfur and phosphorus compounds act as peroxide decomposers generally according to the following generic mechanism:

RSR+R'OOH→RS(O)R+R'OH
RSSR+R'OOH→RS(O)SR+R'OH

Divalent and tetravalent sulfur such as organic sulfides and disulfides are generally more effective than hexavalent compounds. Elementary sulfur is an effective oxidant inhibitor. Sulfurized esters, terpenes, resins, and polybutenes; dialkyl sulfides, polysulfides, diaryl sulfides, thiols, mercaptobenzimidazoles, thiophenes, xanthogenates, thioaldehydes, and others can also be utilized as oxidation inhibitors as well.

Selenium compounds such as dilauryl selenides have also shown good performance as oxidation inhibitors, even better than the corresponding sulfides in the sense that they do not produce unwanted acidic products.

Metal salts of dithiocarbonic and thiophosphoric acids can be used. One example of the latter is zinc dialkyldithiophosphate $Zn(PROR'OS_2)_2$. Some R and R' groups that can be utilized (respectively) in zinc dialkyldithiophosphates are $C_3$–$C_{10}$ primary and secondary alkyl groups.

Some suitable organotin compounds are aryl derivatives of tin, and dibutyltin laurate.

The various classes of antioxidants can be used together to create a synergistic effect. For example, best results in delaying the onset of oxidation reaction are achieved with addition of phenols as main components and a small amount of organosulfur compounds as promotor. The antioxidants in a synergistic system function by different mechanisms so that their combined effect is greater than their sum.

It is preferred that the oxidation-retarding agent should be in a liquid form, usually a viscous liquid. The benefits of using liquid antioxidants are three fold, in addition to their normal role as antioxidants. First, it allows a reduction of total organic non-solvent amount, while still maintaining the lubricity, stiffness and green strength characteristics of the green extrudates. This subsequently brings about a reduction of total heat generated by oxidation due to the reduction of the hydrocarbons entering the kiln. Second, it allows a reduction of water content (used as a solvent for the binder). This in turn produces a stiffer and stronger batch as is described in the previous sections. Third, liquid antioxidants can be easily mixed with the oils (non-solvents) that are used to achieve the desired stiffness for the batch.

Some especially useful antioxidants are phenolic compounds under the name of butylated octylated phenol and butylated di(dimethylbenzyl) phenol, an organosulfur compound under the mane of 1:11 (3,6,9-trioxaudecyo)bis-dodecylthio)propionate, all manufactured by Goodyear Tire. Butylated oxylated phenols have an average molecular weight of 260–374, butylated di(dimethylbenzyl) phenol has an average molecular weight of 386, and 1:11 (3,6,9-trioxaudecyl(bis-dodecylthio)propionate has an average molecular weight of 884–706.

The amount of oxidation-retarding agent used in practice is limited only to what is required. However the usual effective level of oxidation-retarding agents is about 0.1–5 wt. %, with levels of 0.5–3 wt. % being preferred.

Some useful mixture compositions are in percent by weight based on the inorganic powder materials, about 1% to 5% and preferably 2% to 3% binder, about 3% to 15% and preferably 5% to 10% non-solvent, 0 to about 3% and preferably about 0.5% to 1.0% surfactant, about 0.5% to 5% and preferably 0.5% to 1.5% oxidation-retarding agent, and about 15% to 30%, and preferably 20% to 25% water.

One especially preferred mixture based on the above composition contains about 0.7% to 1.3% butylated octylated phenol and about 0.1% to 0.3% 1:11 (3,6,9-trioxaudecyl)bis-(dodecylthio)propionate.

Batch-Forming Mechanics and Shaped Body Post-processing

For best results, the sequence of addition of the various batch components is important. It is preferred that batch formation takes place in two stages prior to the shaping step.

In the first stage or wetting stage of batch formation, the powder particles, surfactant, binder and powdered antioxidants are dry mixed followed by addition of the solvent such as in a Littleford mixer. The solvent is added in an amount that is less than is needed to plasticize the batch. With water as the solvent, the water hydrates the binder and the powder particles. The non-solvent is then added to the mix to wet out the binder and powder particles. If liquid antioxidant is used, (it is preferred that the antioxidant mixes well with the non-solvent) it is added at this point. The non-solvent and/or antioxidant typically has lower surface tension than water. As a result, it wets out the particles much more readily than the solvent. At this stage, the powder particles (which can contain powdered antioxidant) are coated and dispersed by the surfactant, solvent, and non-solvent. (Liquid antioxidant can be present here.)

It is preferred that plasticization take place in the second stage. In this stage the wet mix from the first stage is sheared in any suitable mixer in which the batch will be plasticized, such as for example in a twin-screw extruder/mixer, auger mixer, muller mixer, or double arm, etc. During plasticization, the binder dissolves in the solvent and a gel is formed. The gel that is formed is stiff because the system is very solvent-deficient. The surfactant enables the binder-gel to adhere to the powder particles. The non-solvent partially migrates to the exterior of the particle agglomerates (inter-particle region) and to the interface between the batch and the walls of the vessel containing it, e.g. mixer, or extruder, or die wall. This results in a batch that is stiff in its interior and lubricated on its exterior. Liquid and solid antioxidant addition does not in general affect the batch forming process. Or a similar batch forming can be achieved by adjusting slightly the relative amounts of non-solvent and water after the addition of the antioxidants. As explained earlier, liquid antioxidants can enhance lubrication.

The resulting stiff batch is then shaped into a green body by any known method for shaping plasticized mixtures, such as e.g. extrusion, injection molding, slip casting, centrifugal casting, pressure casting, dry pressing, etc. The invention is best suited for extrusion through a die.

The extrusion operation can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die. The extrusion can be vertical or horizontal.

The bodies of this invention can have any convenient size and shape and the invention is applicable to all processes in which plastic powder mixtures are shaped. The process is especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities range from about 235 cells/cm$^2$ (1500 cells/in$^2$) to about 15 cells/cm$^2$ (100 cells/ in$^2$). Examples of honeycombs produced by the process of the present invention, although it is to be understood that the invention is not limited to such, are those having about 94 cells/cm$^2$ (about 600 cells/in$^2$), or about 62 cells/cm$^2$ (about 400 cells/in$^2$) each having wall thicknesses of about 0.1 mm (4 mils). Typical wall thicknesses are from about 0.07 to about 0.6 mm (about 3 to about 25 mils), although thicknesses of about 0.02–0.048 mm (1–2 mils) are possible with better equipment. The method is especially suited for extruding thin wall/high cell density honeycombs.

The green strength of bodies produced using the oxidation-retarding agent is greater than in the same compositions but without this agent.

The extrudates can then be dried and fired according to known techniques.

The firing conditions of temperature and time depend on the composition and size and geometry of the body, and the invention is not limited to specific firing temperatures and times. For example, in compositions which are primarily for forming cordierite, the temperatures are typically from about 1300° C. to about 1450° C., and the holding times at these temperatures are from about 1 hour to about 6 hours. For mixtures that are primarily for forming mullite, the temperatures are from about 1400° C. to about 1600° C., and the holding times at these temperatures are from about 1 hour to about 6 hours. For cordierite-mullite forming mixtures which yield the previously described cordierite-mullite compositions, the temperatures are from about 1375° C. to about 1425° C. Firing times depend on factors such as kinds and amounts of materials and nature of equipment but typical total firing times are from about 20 hours to about 80 hours. For metal bodies, the temperatures are about 1000° C. to 1400° C. in a reducing atmosphere preferably hydrogen. Firing times depend on factors as discussed above but are typically at least 2 hours and typically about 4 hours. For zeolite bodies, the temperatures are about 400° C. to 1000° C. in air. Firing times depend on factors as discussed above but are typically about 4 hours.

Oils and cellulose ether binders are typically removed from ceramic structures in the temperature region of about 100–400° C. During their removal, much heat is generated through oxidation, even combustion reaction of oil molecules. Large differential heat produced between the core and outer skin of the structure is one of the reasons for the cracking during the early stages of firing. With use of antioxidants, oxidation of the organics is delayed, resulting in fewer cracks in the resulting fired structures.

To more fully illustrate the invention, the following non-limiting examples are presented. All parts, portions, and percentages are on a weight basis unless otherwise stated.

Compositions used for all the examples are listed below in Table 1. Antioxidant used is discussed in the example (not listed in Table 1). The amounts of oil, water, and methylcellulose used are weight percent based on total inorganic materials.

TABLE 1

| Composition | A | B | C |
|---|---|---|---|
| Talc | 40.86 | 40.79 | 40.79 |
| Glomax LL | 29.68 | 27.00 | 27.00 |
| Kaopaque-10 | 12.04 | 14.82 | 14.82 |
| Alcan C701 | | | |
| Alcoa A-16SG | 15.43 | | |
| Imsil | 2.00 | 2.00 | 2.00 |

TABLE 1-continued

| Composition | A | B | C |
|---|---|---|---|
| Water | See example | See example | See example |
| Light mineral oil 1 | 9.2 | See example | — |
| Light mineral Oil 2 | — | — | See example |
| Methylcellulose | 2.7 | 2.7 | 2.7 |
| Stearic acid | 0.6 | 0.6 | 0.6 |

EXAMPLE 1

Baseline Composition A+Powder Antioxidants

The inorganic powders (about 239 g for each batch) are ground and homogenized, and blended together. The antioxidants triphenylmethylmercaptan, 2-mercaptobenzothiozole, 2,6-di-t-butyl-4-methylphenyl, 2,2'-methylenebis(6-t-butyl-4-methylphenyl), and 1,3,5-trimethyl-2,4,6-tris(3',5'-di-t-butyl-4-hydroxybenzyl)benzene, at levels of about 1.4% and 4.4% based on the inorganic materials, were added to inorganic mixtures. The stearic acid surfactant and methocellulose were then added, followed by addition of water and mixing. The amount of water used was about 23.5%. The oil used (light mineral oil 1) is then mixed in. The oil used in these samples was a light mineral oil having a major portion of the molecules in the range of $C_{17}$ to $C_{35}$.

The mixture was then introduced into a torque rheometer (Brabender) for about 4 minutes. The torque experienced was recorded as time elapsed. Peak torque is typically observed at about 1 minute. After 4 minutes elapsed, the material was taken out of the Brabender and cut into small pieces for uniform compaction and air removal in an instrument called an Instrum. These pieces were then compacted for about 5 minutes in an Instrom and peak compaction pressure was observed. Five rods and one ribbon were then extruded, and rod and ribbon final pressure were measured. The stiffness (load/deformation or L/D), and TGA/DTA were then measured.

Typically, the addition of powdered antioxidants requires the addition of a small amount of water to the batch (about 1%). The rheology of the batch can then be adjusted to be comparable to the baseline batch in terms of pressure, torque, and stiffness. The fired properties of the antioxidant containing batches are also very close to the control batches with no antioxidants. The addition of antioxidants at 1–4% levels does not change significantly the properties of the final fired products.

Figure 2:
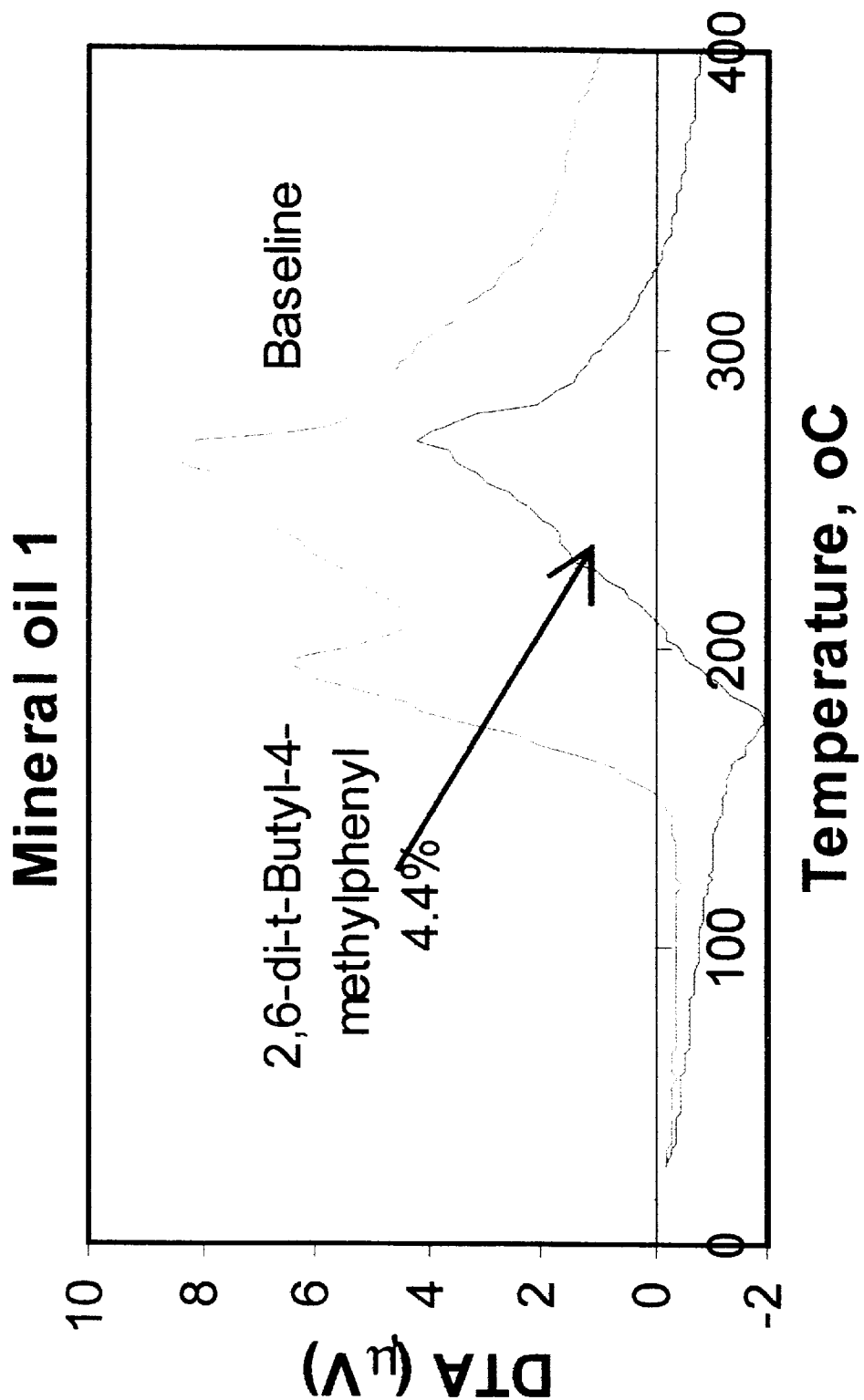

FIGS. 1 and 2 are DTA's that show some general effect of various powdered antioxidants on reaction heat generated. The exact amount of heat reduction is tabulated in Table 2. Baseline composition A (24.5% water, no antioxidant) was used for all of the samples.

Heat of oxidation is effectively reduced by about 55% to 72%. Hindered phenols with bulky t-butyl groups at either side of the OH groups appear to have higher retarding effect than those methyl groups.

TABLE 2

| Name of antioxidant | Amount, wt. % | % Exotherm reduction |
|---|---|---|
| Triphenylmethylmercaptan | 1.4 | 71.5 |
| Triphenylmethylmercaptan | 4.4 | 55.8 |

TABLE 2-continued

| Name of antioxidant | Amount, wt. % | % Exotherm reduction |
|---|---|---|
| 2-Mercaptobenzothiozole | 1.4 | 71.7 |
| 2-Mercaptobenzothiozole | 4.4 | 69.5 |
| 2,6-Di-t-butyl-4-methylphenyl | 1.4 | 63.7 |
| 2,6-Di-t-butyl-4-methylphenyl | 4.4 | 61.8 |
| 2,4,6-Trimethylphenyl | 1.4 | 21.8 |
| 2,4,6-Trimethylphenyl | 4.4 | 41.8 |

EXAMPLE 2

Baseline Composition B+Liquid Antioxidants

The procedure of Example 1 was followed with Composition B. The starting point for the light mineral oil 1 content was about 9.2%. The water level was about 23.5%. This composition was used as the baseline composition B. Liquid antioxidants at a level of about 1.3% to 4.4% were dissolved into light mineral oil 1, which combination was then added to the other ingredients, according to the procedure illustrated in Example 1. It was found that liquid antioxidants can replace a portion of the non-solvent (e.g. light mineral oil 1) and water (solvent) in a ceramic batch. The reduction of water and light mineral oil is highly desirable, as the green strength and stiffness of the shaped green body is increased. Based on the amount of oil and water, the conditions can be categorized into four groups. Selected antioxidants were examined in each group for their effects on rheology, fired properties, and chemical heat generation. A total of nine compositions grouped in four categories are given below to illustrate these benefits.

1. The amount of oil and water remains unchanged from the baseline condition, e.g. about 9.2% of light mineral oil and about 23.5% of water are used in this batch:
   case 1: About 1.3% of butylated octylated phenols as antioxidant
   case 2: About 1.3% of butylated di(dimethylbenzyl) phenol as antioxidant
   case 3: 1.3% of butylated octylated phenols and 0.3% of 1:11 (3,6,9-trioxaudecyl)bis-(dodecylthio) propionate, as antioxidant
2. About 1.3 wt. % of oil is removed from the baseline composition, e.g. 7.9% of light mineral oil and 23.5% of water are used in this batch:
   case 4: About 1.3% of butylated octylated phenols as antioxidant
   case 5: About 1.3% of butylated octylated phenols and 0.3% of 1:11 (3,6,9-trioxaudecyl)bis-(dodecylthio) propionate as antioxidant
3. About 1.3 wt. % of water is removed from the baseline composition, e.g. 9.2% of light mineral oil and 22.2% of water is used in this batch:
   case 6: About 1.3% of butylated octylated phenols as antioxidant
4. About 0.8 wt. % of oil and 0.8 wt. % of water is removed from the baseline composition, e.g. 8.5% of light mineral oil and 22.8% of water is used in this batch:
   Case 7: About 1.3% of butylated octylated phenols as antioxidant
   Case 8: About 0.7% of butylated octylated phenols as antioxidant
   Case 9: About 1.3% of butylated octylated phenols and 0.3% of 1:11 (3,6,9-trioxaudecyl)bis-(dodecylthio) propionate as antioxidant Effect of Antioxidants on the Rheology and Fired Properties.

Table 3 shows the effect of antioxidants on the rheology and fired properties. Typically, the batch with liquid antioxidants has lower torque and extrusion pressure as indicated in Final Torque and Rod Pressure. The strength is clearly increased in fired rods with antioxidants compared to that from the baseline composition, as indicated by modulus of rupture (MOR) and modulus of elasticity (MOE) values. The other fired properties are basically the same as in baseline composition. When the oil and water level kept the same as those in baseline composition, however, the batches are softer as shown by L/D in cases 1, 2, and 3. The L/D value can be adjusted back to higher by removal of oil (cases 4 and 5) or water (case 6) or both (cases 7,8,9).

TABLE 3

Comparison of Rheology and Fired Properties of Baseline Composition and Antioxidants-Containing Batches

| Batch Composition | Peak Torque m-gm | Final Torque 4 min m-gm | Rod Pressure final kg | L/D | MOR psi | Pore Size um | MOE ×10-6 | Porosity % | % Heat Reduction |
|---|---|---|---|---|---|---|---|---|---|
| Baseline Composition B | 5118 | 3497 | 108 | 2.59 | 2289 | 4.33 | 3.31 | 41.9 | |
| Case 1 | 4922 | 2333 | 77 | 1.56 | 2562 | 3.80 | 3.81 | 40.4 | 40 |
| Case 2 | 5174 | 2288 | 81 | 1.55 | 2668 | 3.85 | 3.61 | 40.4 | 27 |
| Case 3 | 4211 | 1893 | 76 | 1.63 | | | | | 51 |
| Case 4 | 4686 | 2502 | 99 | 2.25 | 3100 | 3.73 | 4.00 | 38.4 | 52 |
| Case 5 | 4793 | 2418 | 93 | 1.99 | 3008 | 3.68 | 3.73 | 37.7 | 42 |
| Case 6 | 3150 | 2133 | 118 | 2.69 | 3050 | 3.87 | 4.25 | 36.1 | 65 |
| Case 7 | 4730 | 2762 | 95 | 2.22 | 2970 | 3.75 | 3.95 | 37.6 | 55 |
| Case 8 | 4756 | 3088 | 97 | 2.19 | 3041 | 3.78 | 4.11 | 38.1 | 65 |
| Case 9 | 4433 | 2427 | 110 | 2.50 | 2979 | 4.17 | 3.72 | 38.0 | 74 |

Effect of Antioxidant on Heat Generation During Firing

Heat reduction using liquid antioxidants are in the range between 27 and 74% as shown in the last column of Table 3. Butylated octylated phenols are in general more effective than butylated di(dimethylbenzyl)phenol. The combination of butylated octylated phenols with a small amount of 1:11 (3,6,9-trioxaudecyl)bis-(dodecylthio)propionate gives additional benefit in heat reduction. Maximum benefit is observed using butylated octylated phenols and 1:11 (3,6, 9-trioxaudecyl)bis-(dodecylthio)propionate plus reduction of light mineral oil 1 and water (74%).

Figure 3:
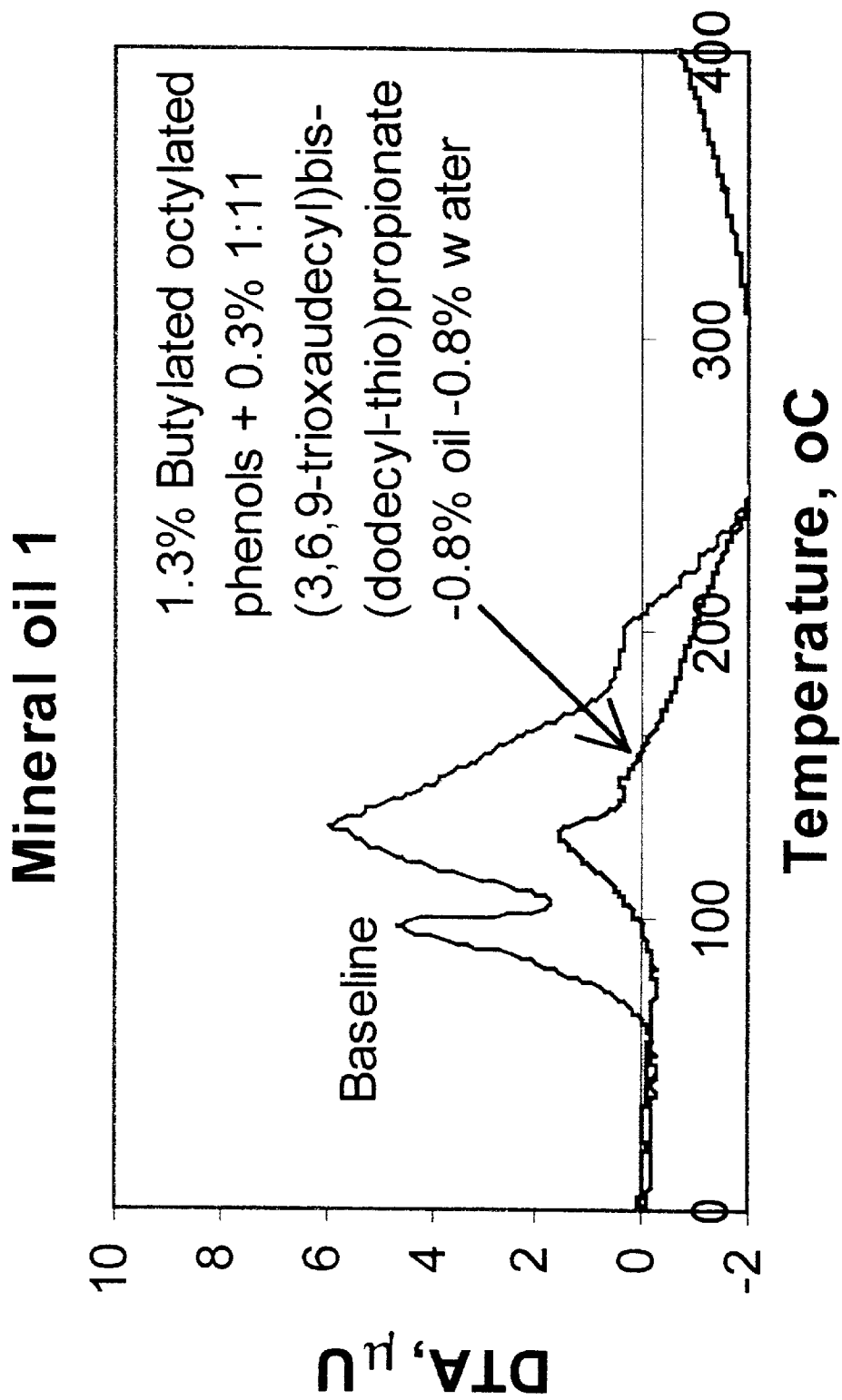
Figure 4:
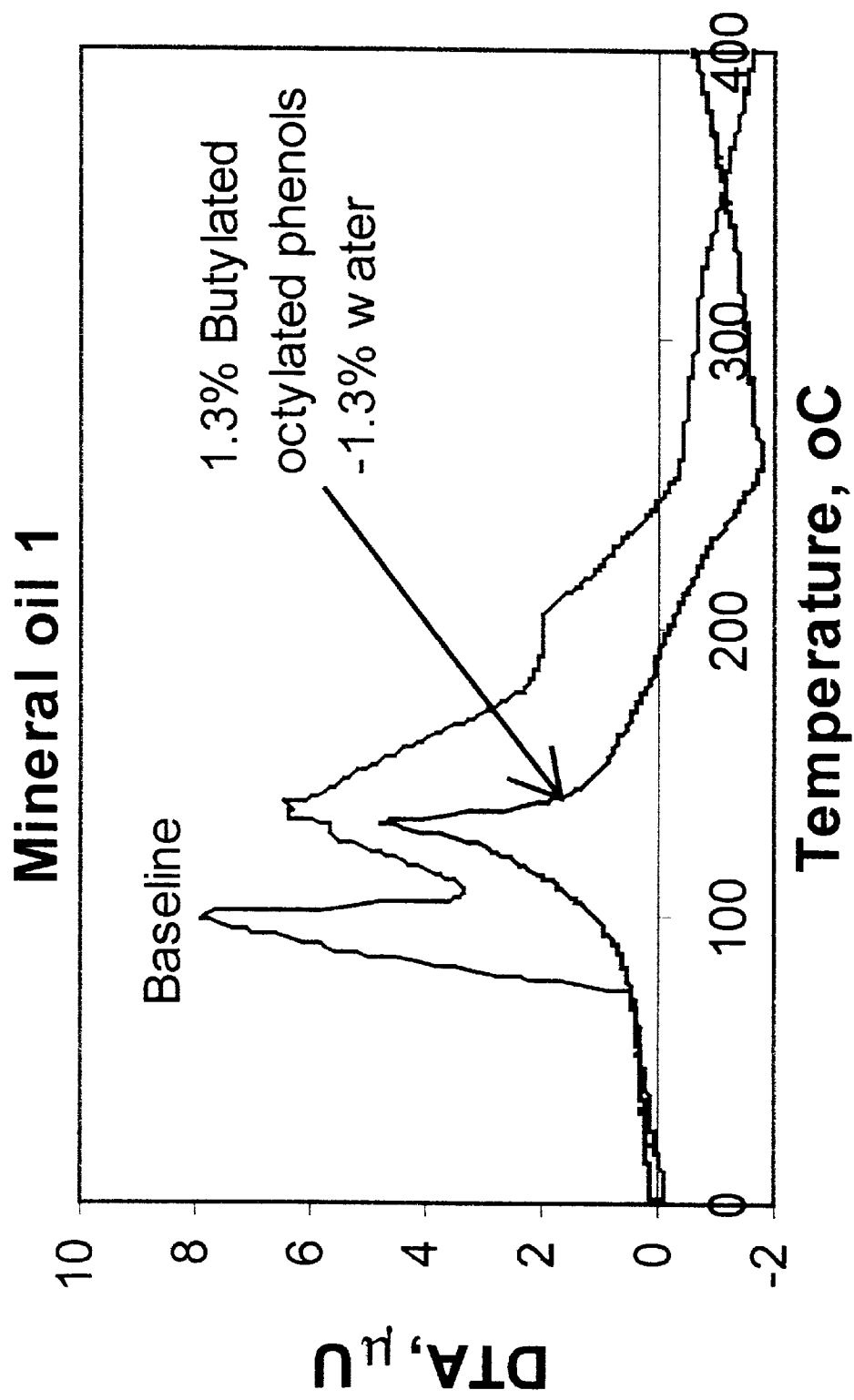

Representative DTA results for some of the above-discussed cases are shown in FIGS. 3 and 4.

EXAMPLE 3

Composition C+Liquid Antioxidant+Light Mineral Oil 2

The composition and procedure are the same as in Example 2 except that the non-solvent is light mineral oil 2 consisting of 90% $C_{20}$, 10% $C_{30}$ in the form of para-α-olefin, and the batches contain about 8% of this mineral oil. The antioxidants are butylated octylated phenols (about 1.3%) and 1:11 (3,6,9-trioxaudecyl)bis-(dodecylthio) propionate (about 0.3%).

Figure 5:
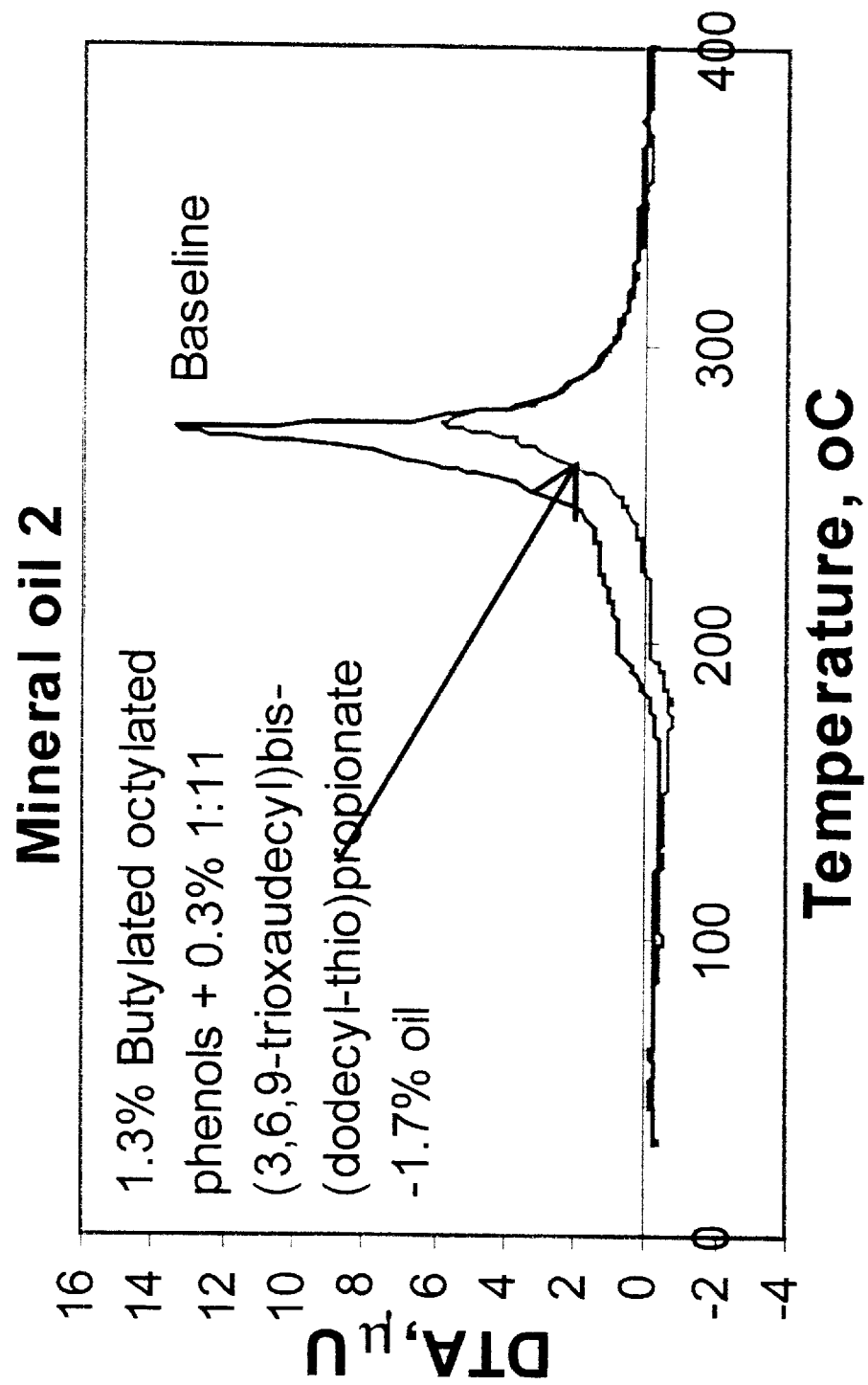

The heat generation is reduced by 30% with the addition of 1.3% butylated octylated phenols and 0.3% of 1:11 (3,6,9-trioxaudecyl)bis-(dodecylthio)propionate when light mineral oil 2 is used in the ceramic batch as the non-solvent. The DTA is shown in FIG. 5. This result shows that the antioxidants are effective oxidation inhibitors in the ceramic firing process irrelevant to the type of oil involved.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for forming an article, the method comprising
   a) forming a mixture of components comprising:
      powder materials,
      organic binder,
      solvent for the binder,
      non-solvent with respect to at least the binder, the solvent, and the powder materials, wherein the non-solvent is lower in viscosity than the binder combined with the solvent, and
      an agent for retarding the oxidation of the organic components;
   b) mixing and plasticizing said components to form a plasticized mixture; and
   c) shaping the plasticized mixture to form a green structure; and
   d) firing the green structure to impart strength thereto and form a product article, whereby the product article has fewer cracks than it would have absent the oxidation-retarding agent.

2. A method of claim 1 wherein the oxidation-retarding agent is selected from the group consisting of free-radical trappers, peroxide decomposers, metal deactivators, and combinations thereof.

3. A method of claim 2 wherein the oxidation-retarding agent is selected from the group consisting of hindered phenols, secondary amines, organosulfur compounds, trivalent phosphorus compounds, selenium compounds, aryl derivatives of tin, and combinations thereof.

4. A method of claim 3 wherein the oxidation-retarding agent is selected from the group consisting of triphenylmethylmercaptan, 2-Mercaptobenzothiozole, 2,6-Di-t-butyl-4-methylphenyl, 2,4,6-Trimethylphenyl, butylated octylated phenols, butylated di(dimethylbenzyl) phenol, 1:11 (3,6,9-trioxaudecyl)bis-(dodecylthio) propionate, and combinations thereof.

5. A method of claim 4 wherein the oxidation-retarding agent is selected from the group consisting of butylated octylated phenols, and a combination of butylated octylated phenol and 1:11 (3,6,9-trioxaudecyl)bis-(dodecylthio) propionate.

6. A method of claim 4 wherein the oxidation-retarding agent is selected from the group consisting of butylated octylated phenols, and a combination of butylated octylated phenol and 1:11 (3,6,9-trioxaudecyl)bis-(dodecylthio) propionate, and the non-solvent is selected from the group consisting of $C_{17}$ to $C_{35}$ paraffins, $C_{20}$ to $C_{30}$ para alpha olefins, and combinations thereof.

7. A method of claim 1 wherein the oxidation-retarding agent is in liquid form.

8. A method of claim 1 wherein the level of oxidation-retarding agent in the mixture is about 0.1% to 5% by weight based on the total weight of the inorganic powder.

9. A method of claim 8 wherein the level of oxidation-retarding agent in the mixture is about 0.5% to 3% by weight based on the total weight of the inorganic powder.

10. A method of claim 1 wherein the non-solvent is selected from the group consisting of paraffins, olefins, aromatics, polymers, and combinations thereof.

11. A method of claim 10 wherein the non-solvent solvent is selected from the group consisting of $C_{17}$ to $C_{35}$ paraffins, $C_{20}$ to $C_{30}$ para alpha olefins, and combinations thereof.

12. A method of claim 1 wherein the mixture comprises in percent by weight based on the inorganic powders, about 1% to 5% binder, about 3% to 15% non-solvent, 0 to about 3% surfactant, about 0.5% to 5% oxidation-retarding agent, and about 15% to 30% water.

13. A method of claim 12 wherein the mixture comprises in percent by weight based on the inorganic powders, about 2% to 3% binder, about 5% to 10% non-solvent, 0.5% to about 1% surfactant, about 0.5% to 1.5% oxidation-retarding agent, and about 20% to 25% water.

14. A method of claim 13 wherein the mixture contains as oxidation-retarding agent content about 0.7% to 1.3% of butylated octylated phenols, and about 0.1% to 0.3% 1:11 (3,6,9-trioxaudecyl)bis-(dodecylthio)propionate.

15. A method of claim 1 wherein the powder materials are cordierite-forming raw materials.

16. A method of claim 15 wherein the mixture is extruded into a honeycomb structure.

17. A method of claim 1 wherein the mixture is shaped into a honeycomb.

18. A method of claim 1 wherein the shaping is done by passing the mixture through an extruder and then through a die to form a green structure.

* * * * *